(12) United States Patent
McCowin

(10) Patent No.: US 8,308,101 B2
(45) Date of Patent: Nov. 13, 2012

(54) SIMPLIFIED FIBER TENSIONING FOR AUTOMATED FIBER PLACEMENT MACHINES

(75) Inventor: Peter D. McCowin, Enumclaw, WA (US)

(73) Assignee: The Boeing Company, Chicago, IL (US)

( * ) Notice: Subject to any disclaimer, the term of this patent is extended or adjusted under 35 U.S.C. 154(b) by 147 days.

(21) Appl. No.: 12/400,600

(22) Filed: Mar. 9, 2009

(65) Prior Publication Data

US 2010/0224716 A1 Sep. 9, 2010

(51) Int. Cl.
*B65H 59/02* (2006.01)
(52) U.S. Cl. .................................................. 242/423.1
(58) Field of Classification Search .................. 242/416, 242/419, 419.8, 419.9, 420, 420.4, 421, 422, 242/423, 423.1, 423.2
See application file for complete search history.

(56) References Cited

U.S. PATENT DOCUMENTS

| | | |
|---|---|---|
| 799,374 A | 9/1905 | Gray et al. |
| 920,776 A | 5/1909 | Pohl |
| 1,132,837 A | 3/1915 | Eggleston |
| 1,195,554 A | 8/1916 | Bourdin |
| 1,370,339 A | 3/1921 | Midgley |
| 1,420,277 A | 6/1922 | McLane |
| 1,464,632 A | 8/1923 | Wayne |
| 1,512,096 A | 10/1924 | Hopkinson |
| 1,930,733 A * | 10/1933 | Tomlin ........................ 242/421.2 |
| 2,182,358 A | 12/1939 | Sheds et al. |
| 2,220,760 A | 11/1940 | Gates et al. |
| 2,345,541 A | 3/1944 | Scholze, Jr. |
| 2,722,590 A | 11/1955 | Engler |
| 2,871,716 A | 2/1959 | Stade |
| 3,037,898 A | 6/1962 | Zumofen |
| 3,137,452 A * | 6/1964 | Winders ...................... 242/420.4 |
| 3,329,181 A | 7/1967 | Buss et al. |
| 3,574,040 A | 4/1971 | Chitwood et al. |
| 3,602,416 A | 8/1971 | Basche et al. |
| 3,684,278 A | 8/1972 | Takahaski |
| 3,695,977 A | 10/1972 | Kandelaki et al. |
| 3,775,219 A | 11/1973 | Karlson et al. |
| 3,810,805 A | 5/1974 | Goldsworthy et al. |
| 3,844,822 A | 10/1974 | Boss et al. |
| 3,910,522 A | 10/1975 | Lee et al. |
| 3,970,831 A | 7/1976 | Hegyi |
| 3,992,240 A | 11/1976 | Kuehn, Jr. |
| 4,091,979 A | 5/1978 | Browder |

(Continued)

FOREIGN PATENT DOCUMENTS

DE 2505223 8/1976

(Continued)

OTHER PUBLICATIONS

Ashizawa et al., "Manufacturing Technology for Polymer Composite Structures," JTEC Panel Report on Advanced Manufacturing Technology for Polymer Composite Structures in Japan, Apr. 1994, 20 pages.

(Continued)

*Primary Examiner* — William E Dondero
(74) *Attorney, Agent, or Firm* — Yee & Associates, P.C.

(57) ABSTRACT

A fiber tensioning device is provided for a spool of fibers. A hub is rotatably mounted on the support and is adapted to have the spool of fibers mounted thereon. Means on the hub apply a drag force on fibers being drawn from the spool to maintain the fibers in tension.

20 Claims, 5 Drawing Sheets

U.S. PATENT DOCUMENTS

| | | | |
|---|---|---|---|
| 4,100,004 A | 7/1978 | Moss et al. | |
| 4,133,711 A | 1/1979 | August et al. | |
| 4,135,447 A | 1/1979 | Barnes et al. | |
| 4,186,861 A * | 2/1980 | Steinhilber | 226/118.2 |
| 4,208,238 A | 6/1980 | August et al. | |
| 4,234,374 A | 11/1980 | Frank | |
| 4,241,884 A * | 12/1980 | Lynch | 242/420 |
| 4,259,144 A | 3/1981 | Ballentine | |
| 4,267,951 A | 5/1981 | Grant et al. | |
| 4,285,752 A | 8/1981 | Higgins | |
| 4,292,108 A | 9/1981 | Weiss et al. | |
| 4,328,061 A | 5/1982 | Off et al. | |
| 4,351,688 A | 9/1982 | Weiss et al. | |
| 4,351,992 A | 9/1982 | Crouch | |
| 4,382,836 A | 5/1983 | Frank | |
| 4,419,170 A | 12/1983 | Blad | |
| 4,432,828 A | 2/1984 | Siempelkamp et al. | |
| 4,461,669 A | 7/1984 | Dontscheff | |
| 4,462,551 A | 7/1984 | Bloch | |
| 4,491,493 A | 1/1985 | Eaton | |
| 4,506,969 A | 3/1985 | Baker | |
| 4,508,584 A | 4/1985 | Charles | |
| 4,531,992 A | 7/1985 | Eaton | |
| 4,541,886 A | 9/1985 | Marlow et al. | |
| 4,557,783 A | 12/1985 | Grone et al. | |
| 4,557,790 A | 12/1985 | Wisbey | |
| 4,560,433 A | 12/1985 | Frank | |
| 4,569,716 A | 2/1986 | Pugh | |
| 4,574,029 A | 3/1986 | Murray | |
| 4,588,466 A | 5/1986 | Eaton | |
| 4,591,402 A | 5/1986 | Evans et al. | |
| 4,627,886 A | 12/1986 | Grone et al. | |
| 4,636,276 A | 1/1987 | Nozaka | |
| 4,680,806 A | 7/1987 | Bolza-Schunemann | |
| 4,696,707 A | 9/1987 | Lewis et al. | |
| 4,699,683 A | 10/1987 | McCowin | |
| 4,706,442 A | 11/1987 | Riemenschneider | |
| 4,707,212 A | 11/1987 | Hailey et al. | |
| 4,750,965 A | 6/1988 | Pippel et al. | |
| 4,781,782 A | 11/1988 | Luhman et al. | |
| 4,799,981 A | 1/1989 | Stone et al. | |
| 4,842,215 A * | 6/1989 | Takami | 242/156 |
| 4,867,834 A | 9/1989 | Alenskis et al. | |
| 4,877,471 A | 10/1989 | McCowin et al. | |
| 4,878,984 A | 11/1989 | Bourrieres | |
| 4,880,488 A | 11/1989 | Matsuo et al. | |
| 4,909,880 A | 3/1990 | Kittelson et al. | |
| 4,938,824 A | 7/1990 | Youngkeit | |
| 4,943,338 A | 7/1990 | Wisbey | |
| 4,978,417 A | 12/1990 | Grimshaw et al. | |
| 4,990,213 A | 2/1991 | Brown et al. | |
| 5,000,397 A | 3/1991 | Darrieux | |
| 5,041,179 A | 8/1991 | Shinno et al. | |
| 5,045,147 A | 9/1991 | Benson et al. | |
| 5,100,493 A | 3/1992 | Leclere et al. | |
| 5,110,395 A | 5/1992 | Vaniglia | |
| 5,114,519 A | 5/1992 | Grimshaw et al. | |
| 5,120,976 A | 6/1992 | Clayton et al. | |
| 5,148,572 A | 9/1992 | Wells et al. | |
| 5,197,198 A | 3/1993 | Onozato | |
| 5,200,018 A | 4/1993 | Gill et al. | |
| 5,213,646 A | 5/1993 | Zsolnay et al. | |
| 5,249,120 A | 9/1993 | Foley | |
| 5,290,386 A | 3/1994 | Trudeau | |
| 5,290,389 A | 3/1994 | Shupe et al. | |
| 5,294,803 A | 3/1994 | Pahr | |
| 5,345,399 A | 9/1994 | Collins | |
| 5,397,415 A | 3/1995 | Manabe et al. | |
| 5,431,749 A | 7/1995 | Messner | |
| 5,448,505 A | 9/1995 | Novak | |
| 5,480,508 A | 1/1996 | Manabe et al. | |
| 5,482,589 A | 1/1996 | Shin et al. | |
| 5,560,942 A | 10/1996 | Curry | |
| 5,562,788 A | 10/1996 | Kitson et al. | |
| 5,627,647 A | 5/1997 | Baan et al. | |
| 5,645,677 A | 7/1997 | Cahuzac et al. | |
| 5,659,229 A | 8/1997 | Rajala | |
| 5,698,066 A | 12/1997 | Johnson et al. | |
| 5,700,347 A | 12/1997 | McCowin | |
| 5,725,175 A | 3/1998 | Thundathil | |
| 5,879,505 A | 3/1999 | Fujisawa et al. | |
| 5,954,917 A | 9/1999 | Jackson et al. | |
| 6,041,840 A | 3/2000 | Ogawa | |
| 6,073,670 A | 6/2000 | Koury | |
| 6,096,164 A | 8/2000 | Benson et al. | |
| 6,100,986 A | 8/2000 | Rydningen | |
| 6,112,792 A | 9/2000 | Barr et al. | |
| 6,164,477 A | 12/2000 | Druckman et al. | |
| 6,215,553 B1 | 4/2001 | Rider et al. | |
| 6,240,333 B1 | 5/2001 | McGee | |
| 6,262,814 B1 | 7/2001 | Furukawa | |
| 6,312,247 B1 | 11/2001 | Kassuelke et al. | |
| 6,315,235 B1 * | 11/2001 | Breyer et al. | 242/422.4 |
| 6,325,568 B1 | 12/2001 | Druckman et al. | |
| 6,391,436 B1 | 5/2002 | Xu et al. | |
| 6,436,528 B1 | 8/2002 | Kulper et al. | |
| 6,441,905 B1 | 8/2002 | Tojyo et al. | |
| 6,451,152 B1 | 9/2002 | Holmes et al. | |
| 6,459,494 B1 | 10/2002 | Kurokawa et al. | |
| 6,474,389 B1 | 11/2002 | Steelman et al. | |
| 6,520,234 B1 | 2/2003 | Anderson et al. | |
| 6,544,367 B1 | 4/2003 | Fujimoto et al. | |
| 6,638,388 B2 | 10/2003 | Nagata et al. | |
| 6,675,688 B2 | 1/2004 | Ostini | |
| 6,706,131 B2 | 3/2004 | Steelman et al. | |
| 6,748,836 B2 | 6/2004 | Vivirito et al. | |
| 6,752,190 B1 | 6/2004 | Boll et al. | |
| 6,764,754 B1 | 7/2004 | Hunter et al. | |
| 6,767,426 B1 | 7/2004 | Yamamoto | |
| 6,773,537 B2 | 8/2004 | Erickson et al. | |
| 6,799,081 B1 | 9/2004 | Hale et al. | |
| 6,799,619 B2 | 10/2004 | Holmes et al. | |
| 6,823,342 B2 | 11/2004 | Wallen et al. | |
| 6,860,957 B2 | 3/2005 | Sana et al. | |
| 6,900,547 B2 | 5/2005 | Polk Jr. et al. | |
| 6,966,966 B2 | 11/2005 | Koizumi et al. | |
| 6,968,971 B2 | 11/2005 | Ely | |
| 6,979,501 B2 | 12/2005 | Merton | |
| 6,984,429 B2 | 1/2006 | Thunhorst et al. | |
| 7,010,544 B2 | 3/2006 | Wallen et al. | |
| 7,048,024 B2 | 5/2006 | Clark et al. | |
| 7,063,118 B2 | 6/2006 | Hauber et al. | |
| 7,137,182 B2 | 11/2006 | Nelson | |
| 7,206,665 B2 | 4/2007 | Groppe | |
| 7,213,629 B2 | 5/2007 | Ledet et al. | |
| 7,282,107 B2 | 10/2007 | Johnson et al. | |
| 7,293,590 B2 | 11/2007 | Martin | |
| 7,326,312 B1 | 2/2008 | Rust et al. | |
| 7,337,818 B2 | 3/2008 | Briese et al. | |
| 7,341,086 B2 | 3/2008 | Nelson et al. | |
| 7,376,480 B2 | 5/2008 | Hagen et al. | |
| 7,407,556 B2 | 8/2008 | Oldani et al. | |
| 7,419,031 B2 | 9/2008 | Liguore et al. | |
| 7,455,740 B2 | 11/2008 | Bostanjoglo et al. | |
| 7,455,742 B2 | 11/2008 | Ledet et al. | |
| 7,472,736 B2 | 1/2009 | Kisch et al. | |
| 7,478,780 B2 | 1/2009 | Wilding et al. | |
| 7,517,426 B2 | 4/2009 | Mano et al. | |
| 7,527,084 B2 | 5/2009 | Kaczkowski | |
| 7,536,242 B2 | 5/2009 | Ledet et al. | |
| 7,591,294 B2 | 9/2009 | Wampler et al. | |
| 7,643,970 B2 | 1/2010 | Drumheller et al. | |
| 7,681,615 B2 | 3/2010 | McCowin | |
| 7,717,151 B2 | 5/2010 | Wampler et al. | |
| 7,747,421 B2 | 6/2010 | Tang et al. | |
| 7,748,425 B2 | 7/2010 | Tingley | |
| 7,766,063 B2 | 8/2010 | Lauder et al. | |
| 7,769,481 B2 | 8/2010 | Tang et al. | |
| 7,809,454 B2 | 10/2010 | Hu et al. | |
| 7,824,512 B2 | 11/2010 | Lauder et al. | |
| 7,842,145 B2 | 11/2010 | Hogg | |
| 7,849,903 B2 | 12/2010 | Vaniglia | |
| 7,867,352 B2 | 1/2011 | Johnson et al. | |
| 7,922,856 B2 | 4/2011 | Hagman et al. | |
| 8,029,642 B2 | 10/2011 | Hagman | |
| 8,147,637 B2 | 4/2012 | Kisch et al. | |
| 8,156,988 B2 | 4/2012 | Martinez | |

| | | | |
|---|---|---|---|
| 2003/0015298 A1 | 1/2003 | Steelman et al. |
| 2003/0102070 A1 | 6/2003 | Black et al. |
| 2003/0145932 A1 | 8/2003 | Holmes et al. |
| 2004/0026025 A1 | 2/2004 | Sana et al. |
| 2004/0112534 A1 | 6/2004 | Koizumi et al. |
| 2004/0226651 A1 | 11/2004 | Ledet et al. |
| 2005/0016671 A1 | 1/2005 | Sharp |
| 2005/0039842 A1 | 2/2005 | Clark et al. |
| 2005/0039843 A1 | 2/2005 | Johnson et al. |
| 2005/0194210 A1 | 9/2005 | Panossian |
| 2005/0227124 A1 | 10/2005 | Merton |
| 2005/0247396 A1 | 11/2005 | Oldani et al. |
| 2006/0073309 A1 | 4/2006 | Hogg |
| 2006/0090856 A1 | 5/2006 | Nelson et al. |
| 2006/0106507 A1 | 5/2006 | Ledet et al. |
| 2006/0118244 A1 | 6/2006 | Zaballos et al. |
| 2006/0147669 A1 | 7/2006 | Mano et al. |
| 2006/0162143 A1 | 7/2006 | Nelson et al. |
| 2006/0180270 A1 | 8/2006 | Ledet et al. |
| 2006/0226651 A1 | 10/2006 | Griswold et al. |
| 2006/0260751 A1 | 11/2006 | Lauder et al. |
| 2007/0029030 A1 | 2/2007 | McCowin |
| 2007/0034340 A1 | 2/2007 | Kaczkowski |
| 2007/0039434 A1 | 2/2007 | DeVlieg et al. |
| 2007/0044896 A1 | 3/2007 | Tingley |
| 2007/0044900 A1 | 3/2007 | Tingley |
| 2007/0069080 A1 | 3/2007 | Rassaian et al. |
| 2007/0102239 A1 | 5/2007 | Liguore et al. |
| 2007/0106407 A1 | 5/2007 | Drumheller et al. |
| 2007/0106418 A1 | 5/2007 | Hagen et al. |
| 2007/0144676 A1 | 6/2007 | Tang et al. |
| 2007/0150087 A1 | 6/2007 | Tang et al. |
| 2007/0187024 A1 | 8/2007 | Johnson et al. |
| 2007/0234907 A1 | 10/2007 | Torres Martinez |
| 2008/0277057 A1 | 11/2008 | Montgomery et al. |
| 2008/0282863 A1 | 11/2008 | McCowin |
| 2008/0302483 A1 | 12/2008 | Vaniglia |
| 2009/0025875 A1 | 1/2009 | Hagman |
| 2009/0076638 A1 | 3/2009 | Hu et al. |
| 2009/0078361 A1 | 3/2009 | Kisch et al. |
| 2009/0079998 A1 | 3/2009 | Anderson et al. |
| 2009/0166467 A1 | 7/2009 | Hagman et al. |
| 2009/0205767 A1 | 8/2009 | Lauder et al. |
| 2009/0211698 A1 | 8/2009 | Mccowin |
| 2010/0006205 A1 | 1/2010 | Mccowin et al. |
| 2010/0193103 A1 | 8/2010 | Mccowin |
| 2010/0230043 A1 | 9/2010 | Kisch |
| 2011/0114265 A1 | 5/2011 | Hagman et al. |
| 2011/0277941 A1 | 11/2011 | Hagman |

FOREIGN PATENT DOCUMENTS

| | | |
|---|---|---|
| DE | 20120792 | 5/2003 |
| DE | 10342658 | 4/2005 |
| EP | 1775108 | 4/2007 |
| EP | 1804146 | 7/2007 |
| EP | 1859917 | 11/2007 |
| EP | 1977882 | 10/2008 |
| EP | 1992473 | 11/2008 |
| EP | 2077246 | 7/2009 |
| EP | 10 25 0405 | 6/2010 |
| EP | 2228200 | 9/2010 |
| EP | 2228333 | 9/2010 |
| ES | 2253005 | 5/2006 |
| GB | 2065566 | 7/1981 |
| JP | 05126536 | 5/1993 |
| JP | 07182724 | 7/1995 |
| JP | 08327330 | 12/1996 |
| JP | 09210665 | 8/1997 |
| JP | 2006347121 | 12/2006 |
| SU | 101922 | 5/1983 |
| WO | WO0196223 | 12/2001 |
| WO | WO03035380 | 5/2003 |
| WO | WO2005030458 | 4/2005 |
| WO | WO2005105641 | 11/2005 |
| WO | WO2006021601 | 3/2006 |
| WO | WO2006060270 | 6/2006 |
| WO | WO2006101379 | 9/2006 |
| WO | WO2006118692 | 11/2006 |
| WO | WO2009038895 | 3/2009 |
| WO | WO2009038943 | 3/2009 |
| WO | WO2009108517 | 9/2009 |
| WO | WO2010005996 | 1/2010 |

OTHER PUBLICATIONS

Cincinnati Milacron, "Into the Future With Better Ways to Automate the Manufacture of Composite Parts," Cincinnati Milacron Publication No. SP-152-3, 1998, 22 pages.

Collins, "Measuring Small," Computer Technology Review, vol. XXV No. 3, 2005, 5 pages.

European Search Report dated Sep. 15, 2008, regarding Application No. EP08008877 (EP1992473), 3 pages.

European Search Report dated Nov. 30, 2010, regarding Application No. EP08173139 (EP2077246), 2 pages.

European Search Report dated Jun. 23, 2010, regarding Application No. EP10250484 (EP2228200), 3 pages.

Evans et al., "Fiber Placement Process Study," Sampe 34th Symposium Book of Proceedings, Reno, NV, May 8-11, 1989, pp. 1822-1833.

Guillermin, "Advanced Composite Engineering using MSC.Pantran and FiberSIM," Composite Design Technologies, Jul. 20, 2004, 15 pages.

International Search Report dated Apr. 1, 2005, regarding Application No. PCT/US2004/015144 (WO2005030458), 2 pages.

International Search Report dated Aug. 30, 2006, regarding Application No. PCT/US2006/010704 (WO2006118692), 3 pages.

International Search Report dated Dec. 3, 2008, regarding Application No. PCT/US2008/072450 (WO2009038895), 3 pages.

International Search Report dated Mar. 2, 2009, regarding Application No. PCT/US2008/074612 (WO2009038943), 4 pages.

International Search Report dated May 28, 2009 regarding Application No. PCT/US2009/034048 (WO2009108517), 2 pages.

International Search Report dated Feb. 5, 2010, regarding Application No. PCT/US2009/049850 (WO2010005996), 2 pages.

Koschmieder et al., "On-Line Tow Width Measurement in Filament Winding," Proceedings of the 45th International Sampe Symposium and Exhibition, Long Beach, CA, May 21-25, 2000, pp. 1417-1426.

Morrison et al., "Automatic Controlled Apparatus for Producing Tobacco Smoke Filter Rods," USPTO Defensive Publication No. T941,011, Dec. 2, 1975, 3 pages.

Olsen et al., "Automated Composite Tape Lay-up Using Robotic Devices," Proceedings of the International Conference on Robotics and Automation, Atlanta, GA, May 1993, pp. 291-297.

USPTO Office Action dated Jan. 11, 2005 regarding U.S. Appl. No. 10/437,067, 10 pages.

USPTO Final Office Action dated Jul. 1, 2005 regarding U.S. Appl. No. 101437,067, 9 pages.

USPTO Office Action dated Feb. 17, 2006 regarding U.S. Appl. No. 10/437,067, 10 pages.

USPTO Notice of Allowance dated Sep. 13, 2006 regarding U.S. Appl. No. 10/437,067, 7 pages.

USPTO Supplemental Notice of Allowance dated Dec. 27, 2006 regarding U.S. Appl. No. 10/437,067, 4 pages.

USPTO Office Action dated Feb. 6, 2008 regarding U.S. Appl. No. 11/116,222, 13 pages.

USPTO Final Office Action dated Sep. 5, 2008 regarding U.S. Appl. No. 11/116,222, 12 pages.

USPTO Notice of Allowance dated Mar. 27, 2009 regarding U.S. Appl. No. 11/116,222, 4 pages.

USPTO Office Action dated Jun. 6, 2009 regarding U.S. Appl. No. 11/116,222, 11 pages.

USPTO Office Action dated Nov. 24, 2009 regarding U.S. Appl. No. 11/116,222, 9 pages.

USPTO Notice of Allowance dated Mar. 25, 2010 regarding U.S. Appl. No. 11/116,222, 5 pages.

USPTO Office Action dated Feb. 1, 2010 regarding U.S. Appl. No. 12/423,472, 36 pages.

USPTO Office Action dated Jul. 8, 2010 regarding U.S. Appl. No. 12/423,472, 25 pages.

USPTO Notice of Allowance dated Sep. 17, 2010 regarding U.S. Appl. No. 12/423,472, 6 pages.

USPTO Office Action dated Mar. 5, 2008 regarding U.S. Appl. No. 11/196,455, 12 pages.
USPTO Final Office Action dated Jul. 17, 2008 regarding U.S. Appl. No. 11/196,455, 11 pages.
USPTO Office Action dated Jan. 28, 2009 regarding U.S. Appl. No. 11/196,455, 10 pages.
USPTO Final Office Action dated Jul. 9, 2009 regarding U.S. Appl. No. 111196,455, 8 pages.
USPTO Notice of Allowance dated Nov. 4, 2009 regarding U.S. Appl. No. 11/196,455, 8 pages.
USPTO Office Action dated Aug. 13, 2009 regarding U.S. Appl. No. 11/750,154, 9 pages.
USPTO Office Action dated Dec. 28, 2009 regarding U.S. Appl. No. 11/750,154, 7 pages.
USPTO Office Action dated May 25, 2010 regarding U.S. Appl. No. 11/750,154, 7 pages.
USPTO Final Office Action dated Sep. 14, 2010 regarding U.S. Appl. No. 11/750,154, 5 pages.
USPTO Office Action dated Aug. 21, 2009 regarding U.S. Appl. No. 11/856,372, 21 pages.
USPTO Final Office Action dated Jan. 27, 2010 regarding U.S. Appl. No. 11/856,372, 16 pages.
USPTO Notice of Allowance dated Apr. 30, 2010 regarding U.S. Appl. No. 11/856,372, 4 pages.
USPTO Supplemental Notice of Allowance dated Jul. 21, 2010 regarding U.S. Appl. No. 11/856,372, 2 pages.
USPTO Office Action dated Sep. 15, 2010 regarding U.S. Appl. No. 11/829,525, 11 pages.
USPTO Final Office Action dated Feb. 2, 2011 regarding U.S. Appl. No. 11/829,525, 12 pages.
USPTO Notice of Allowance dated Jun. 21, 2011 regarding U.S. Appl. No. 11/29,525, 8 pages.
USPTO Office Action dated Mar. 31, 2010 regarding U.S. Appl. No. 11/859,745, 18 pages.
USPTO Final Office Action dated Oct. 14, 2010 regarding U.S. Appl. No. 11/859,745, 22 pages.
USPTO Office Action dated Mar. 28, 2011 regarding U.S. Appl. No. 11/859,745, 24 pages.
USPTO Ex Parte Quayle Action dated Jan. 4, 2012 regarding U.S. Appl. No. 11/859,745, 9 pages.
USPTO Notice of Allowance dated Feb. 13, 2012 regarding U.S. Appl. No. 11/859,745, 9 pages.
USPTO Office Action dated Aug. 19, 2010 regarding U.S. Appl. No. 111968,542, 10 pages.
USPTO Notice of Allowance dated Dec. 17, 2010 regarding U.S. Appl. No. 11/968,542, 9 pages.
USPTO Notice of Allowance dated Apr. 25, 2012 regarding U.S. Appl. No. 131012,617, 16 pages.
USPTO Office Action dated May 17, 2011 regarding U.S. Appl. No. 12/038,155, 11 pages.
USPTO Final Office Action dated Oct. 19, 2011 regarding U.S. Appl. No. 12/038,155, 9 pages.
USPTO Office Action dated Nov. 7, 2011 regarding U.S. Appl. No. 12/498,307, 15 pages.
USPTO Final Office Action dated Mar. 8, 2012 regarding U.S. Appl. No. 12/498,307, 14 pages.
USPTO Office Action dated May 10, 2011 regarding U.S. Appl. No. 12/363,749, 11 pages.
USPTO Final Office Action dated Feb. 21, 2012 regarding U.S. Appl. No. 12/363,749, 8 pages.
USPTO Office Action dated Jun. 22, 2011 regarding U.S. Appl. No. 12/404,265, 9 pages.
USPTO Notice of Allowance dated Nov. 10, 2011 regarding U.S. Appl. No. 12/404,265, 7 pages.
USPTO Notice of Allowance dated Feb. 17, 2012 regarding U.S. Appl. No. 12/404,265, 9 pages.
USPTO Notice of Allowance dated Jun. 8, 2012 regarding U.S. Appl. No. 11/859,745, 40 pages.
USPTO Supplemental Notice of Allowance dated Jun. 19, 2012 regarding U.S. Appl. No. 11/859,745, 38 pages.
USPTO Office Action, dated Jun. 21, 2012, regarding U.S. Appl. No. 13/189,160, 45 pages.
USPTO Notice of Allowance, dated Jul. 9, 2012, regarding U.S. Appl. No. 13/012,617, 36 pages.

* cited by examiner

SIMPLIFIED FIBER TENSIONING FOR AUTOMATED FIBER PLACEMENT MACHINES

CROSS REFERENCE TO RELATED APPLICATIONS

This application is related to co-pending U.S. patent application Ser. No. 12/038,155, filed on Feb. 27, 2008, which is incorporated by reference herein in its entirety.

TECHNICAL FIELD

This disclosure generally relates to automated fiber placement machines, especially those used to layup composite structures, and deals more particularly with a simplified fiber tensioning system.

BACKGROUND

Composite structures such as those used in the automotive, marine and aerospace industries may be fabricated using automated composite material application machines, commonly referred to as automated fiber placement (AFP) machines. AFP machines may be used in the aircraft industry, for example to fabricate structural shapes and skin assemblies by wrapping relatively narrow strips of composite, slit fiber tape or "tows" around a manufacturing tool. The AFP machine aligns and places a plurality of the tape strips, typically six or more, in continuous, edge-to-edge contact forming a single wide, conformal bandwidth which is placed on and compacted against the tool.

In the past, AFP machines have been relatively large and complex in order to provide features and functions that allow them to fabricate a wide range of large scale structures. During tape placement, the fiber tape is drawn from spools of the tape mounted on the machine. It is necessary to maintain a proper amount of tension on the fiber tape as it is drawn from the spools, and to compensate for slack in the tape which may occur during normal AFP machine operation. Tensioning of the fiber tape is controlled by a relatively complicated feedback system that employs a looped network of servo motor drives and sensor arrays. Other tensioning systems have employed a rotational drag brake and release mechanism combined with external torsion spring biased rollers to compensate for variations in tape slack.

More recently, smaller, simplified AFP machines have been proposed that are capable of placing narrower fiber tows, and are therefore may be better suited for fabricating smaller structures and components. Although the mechanisms used in the fiber placement heads of these simplified AFP machines are smaller and have reduced complexity, the machines nevertheless utilize standard size spools of composite fiber tape of the type discussed above. The use of known, relatively complicated fiber tensioning systems may not be compatible with these smaller AFP machines.

Accordingly, there is a need for a simplified fiber tensioning device that may be used with simplified AFP machines using standard size spools of tape.

SUMMARY

According to the disclosed embodiments, a simplified device is provided for maintaining fiber tension and for compensating for fiber slack in fiber placement machines. The device allows compact packaging of multiple standard size spools of composite fibers on an AFP head which provides fiber tensioning and slack compensation within each independent hub upon which a spool is mounted.

According to one embodiment, a fiber tensioning device is provided for use with a spool of fiber from which fibers are drawn. A hub is rotatably mounted on a support and is adapted to have a spool of fibers mounted thereon for rotation on the support. Means on the hub apply drag force on the fibers being drawn from the spool in order to maintain tension on the fibers. The means for applying drag force may include biasing means for applying a force to the hub in a direction resulting in drag force being applied to the fibers drawn from the spool, and means for limiting the rotational force applied to the hub by the spring. The means for limiting the rotational force may include a clutch which includes a clutch disc and a friction pad frictionally engaging the clutch disc.

According to another embodiment, a device for maintaining tension on fiber drawn from a spool may be used with an automatic fiber placement system having at least one supply spool of fibers. The device includes a rotatable hub adapted to have a supply spool mounted thereon for rotation for the hub. Means are provided in the hub for applying a rotational force on the hub opposing a force applied thereon by fibers being drawn from the spool.

According to a further embodiment, a method is provided of maintaining tension on fibers being drawn from a fiber supply spool in an automatic fiber placement system. The method includes placing the spool on a hub, and using a spring to apply a rotational force to the hub that maintains tension on the fibers being drawn from the spool. The method may further comprise using a clutch inside the hub to limit the amount if force applied to the hub by the spring. The clutch may be selectively disengaged to reduce the tension on the fibers being drawn from the spool.

The disclosed embodiments satisfy the need for a simplified device for tensioning fibers and compensating for fiber slack in a simplified, smaller automatic fiber placement machine employing standard size spools of fiber tape.

BRIEF DESCRIPTION OF THE ILLUSTRATIONS

DETAILED DESCRIPTION

Figure 1:
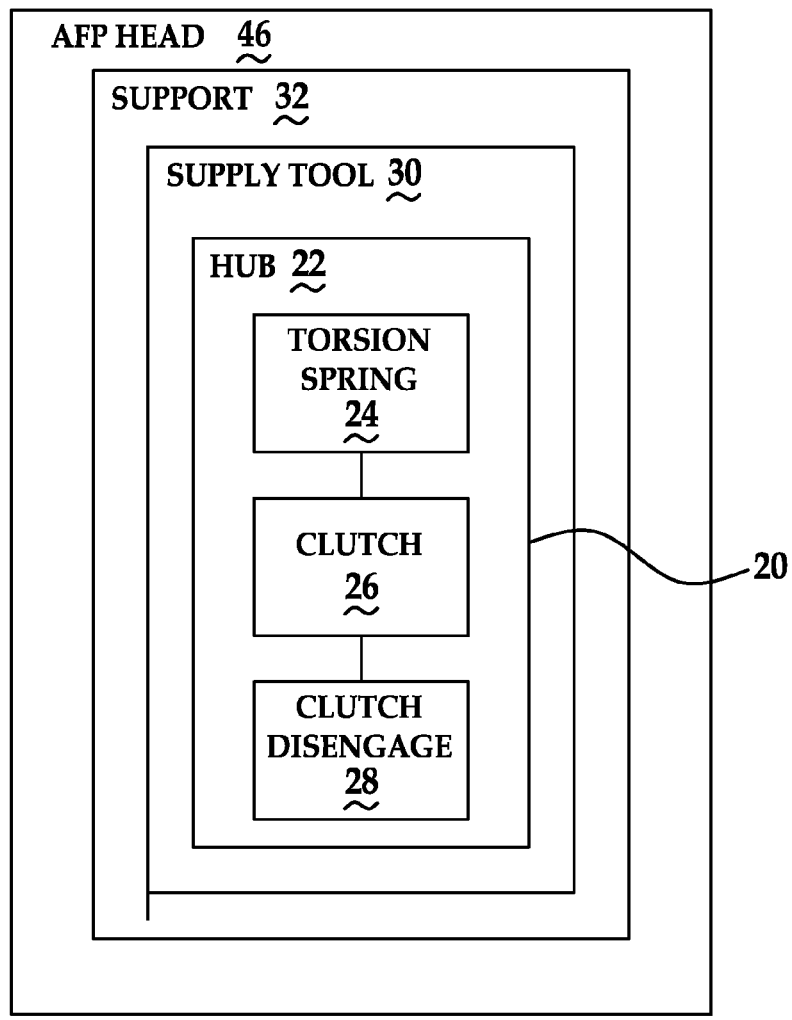
FIG. 1 is an illustration of a functional block diagram of a simplified fiber tensioning device according to the disclosed embodiments.

Referring first to FIG. 1, the disclosed embodiments generally relate to a device 20 used to apply tension in fibers and compensate for fiber slack in an automatic fiber placement (AFP) head 46. The device 20 includes a hub 22 containing biasing means in the form of a torsion spring 24 which is connected to the hub 22 through a clutch 26 which limits the amount of force applied to the hub 22 by the spring 24. The device 20 may optionally include a clutch disengagement device 28 which selectively disengages the clutch 26 in order to suspend the tension applied to the hub 22 by the torsion spring 20. A supply spool 30 of fibers is mounted on the hub 22 and the combination of the hub 22 and the supply spool 30 are mounted on a support 32 forming part of the AFP head 46.

Figure 2:
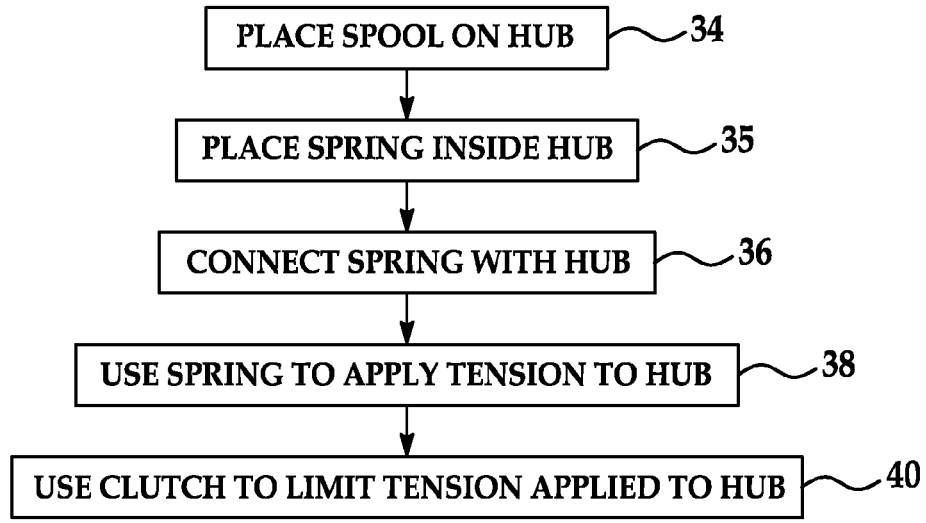
FIG. 2 is an illustration of a flow diagram showing the overall steps of a method for maintaining tension on fibers being drawn from a supply spool.

FIG. 2 broadly illustrates the steps of a method of using the device 22 to apply tension in fibers being drawn from the supply spool 30 during an ordinary fiber placement operation performed by the AFP head 46. Beginning at 34, the supply spool 30 is placed on the hub 22. A spring 24 is placed inside the hub 22 at 35. At 36, the torsion spring 24 is connected between the hub 22 and the support 32. At 38, the torsion spring 24 is used to apply tension to the hub 22. Finally, at 40, the clutch 26 may be used to suspend the tension being applied to the hub 22 by the spring 24.

Figure 3:
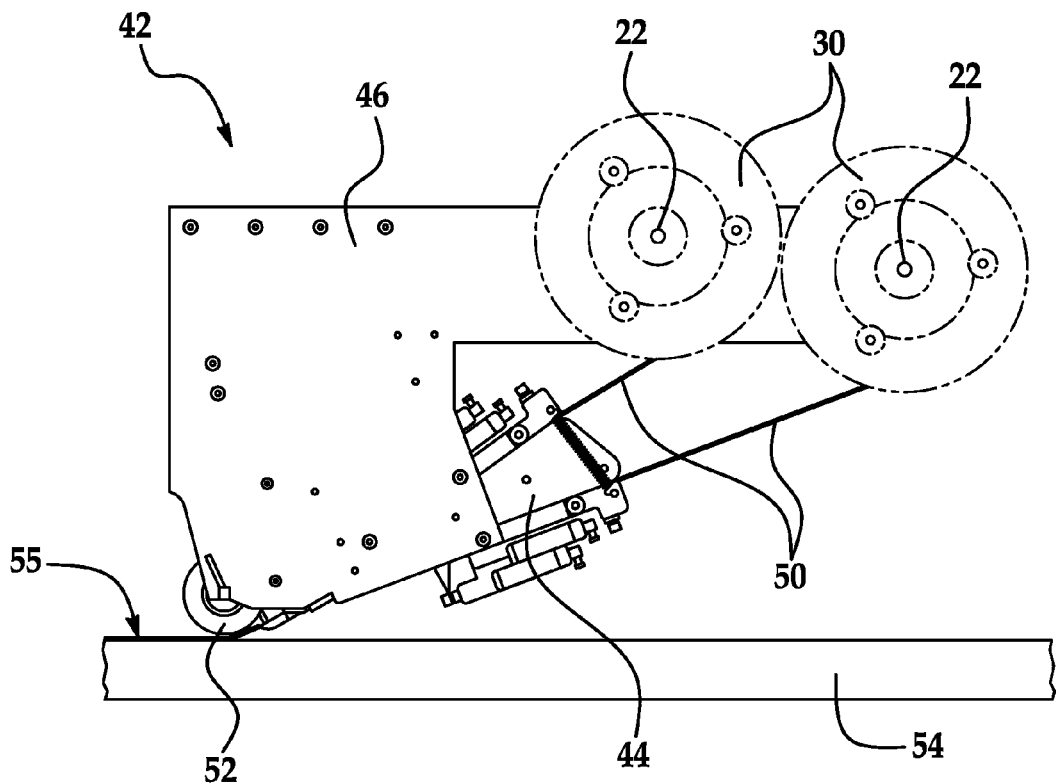
FIG. 3 is an illustration of a side view of a reduced complexity fiber placement head employing standard size spools of fibers and a simplified fiber tensioning device.
Figure 4:
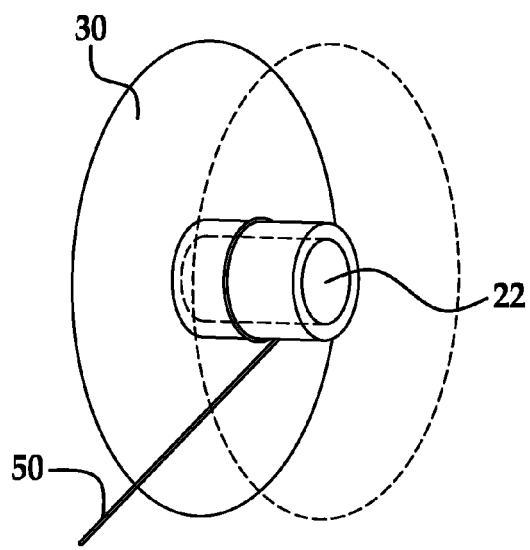
FIG. 4 is an illustration of a diagrammatic, perspective view of one of the spools shown in FIG. 3, mounted on a hub.

Attention is now directed to FIGS. 3 and 4 which illustrate further details of the AFP head 42 and supply spools 30. The head 42 may include a frame 46 on which there is mounted one or more supply spools 30 of fibers 50. As used herein, "fiber" and "fibers" refers to composite fibers that may be in the form of composite fiber tape that may be cut into narrow strips which are sometimes referred to as tows, as well as to fiber rovings. Although two supply spools 30 are shown in the drawings, more or less than two spools may be present on the head 42. Each of the supply spools 30 is removably supported on a hub 22 for rotation therewith, and feeds fibers 50 to one or more fiber alignment and re-thread mechanisms 44. The mechanisms guide the fibers 50 into aligned, side-by-side relationship to form a bandwidth 55 which may be cut by a mechanism 44 and compacted onto a substrate 54 by a compaction roller 52.

Figure 5:
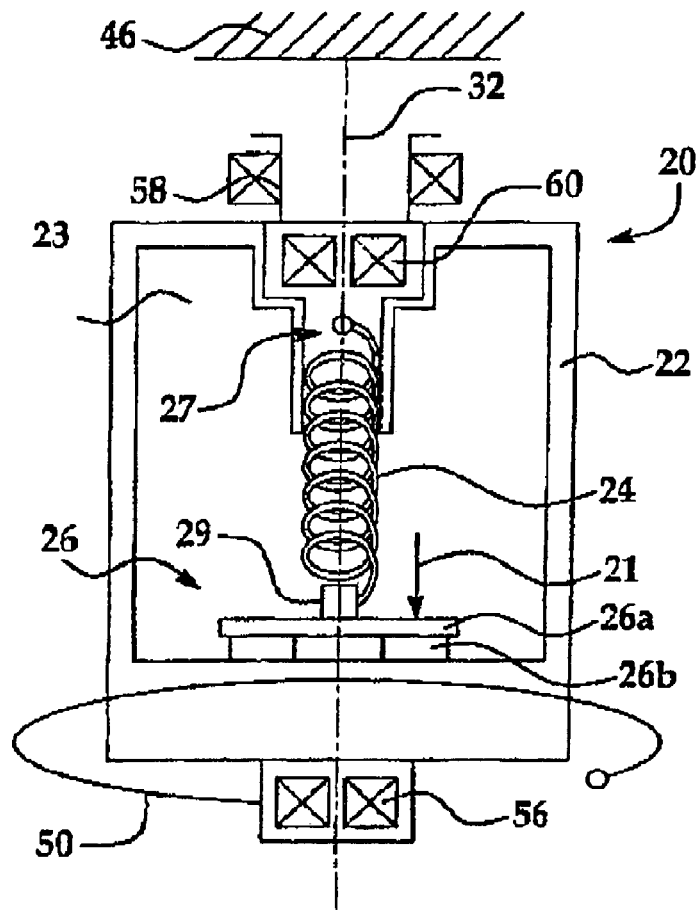
FIG. 5 is an illustration of a longitudinal sectional view of the hub shown in FIG. 4.
Figure 6:
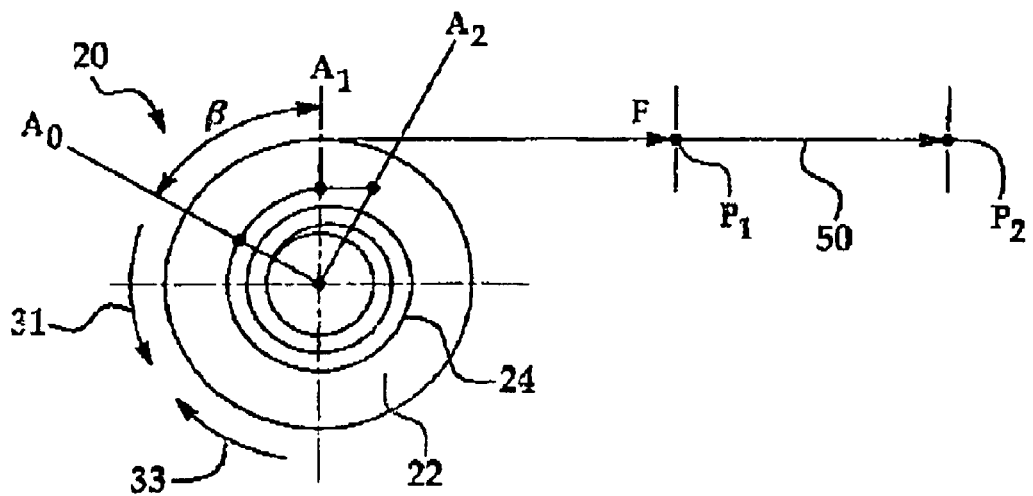
FIG. 6 is an illustration of an end view of the hub shown in FIG. 5.
Figure 7:
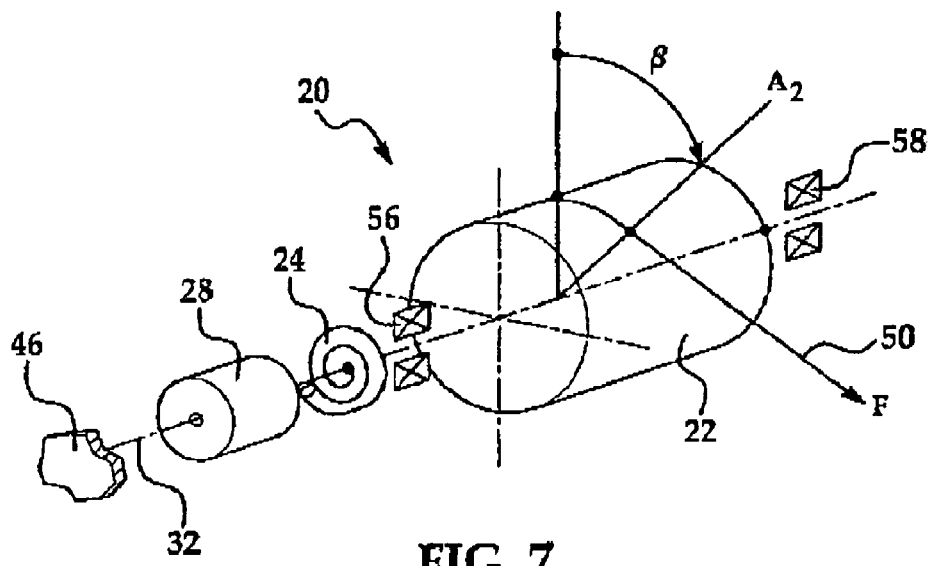
FIG. 7 is an illustration of an exploded, perspective view of the hub shown in FIGS. 5 and 6.

Attention is now directed to FIGS. 5, 6 and 7 which illustrate further details of the device 20. The hub 22 is generally cylindrical in shape and includes an essentially open interior 23. A shaft 32 fixed on the frame 46 extends longitudinally through the center of the hub 22 and provides a means for supporting both the hub 22 and the supply spool 30 on the head 42. The hub 22 is rotatably mounted on the shaft 32 by means of a pair of bearings 56 and 60.

A helical torsion spring 24 is sleeved over the shaft 32 inside the hub 22 and has one end 27 thereof fixed to the shaft 32 so that end 27 remains stationary. The opposite end 29 of the torsion spring 24 is fixed to a clutch disc 26a forming part of a clutch 26 that includes friction pads 26b fixed on the hub 22. The spring 24 is compressed between ends 27 and 29 and therefore generates a compressive force that biases the clutch disc 26a in the direction shown by the frictional drag 21 into frictional engagement with the friction pads 26b which may rotate along with the hub 22. Initial rotation of the hub 22 results in winding up the torsion spring 24 until the angular torsion force applied to the clutch disc 26a by the spring 24 in the direction shown by the arrow 31 (FIG. 6) overcomes the friction between the clutch disc 26a and the pads 26b, at which point the clutch disc 26a slips relative to the pads 26b as the pads 26b continue to turn.

As hub 22 rotates on shaft 32, the clutch disc 26a frictionally engages the pads 26b to produce frictional drag on hub 22 shown by the arrow 31 in FIG. 6, in turn applying tension to fibers 50 being drawn off the supply spool 30. The spring 24 is maintained concentric with the shaft 32 by a bearing 58 and the end of 29 of the spring 24 that is fixed to the clutch disc 26a. The clutch 26 limits the amount of torsional force applied by the spring 24 to the hub 22. The frictional drag applied by the spring 24 through the clutch 26 to the hub 22 determines the amount of tension force applied to the fibers 50 being drawn from the supply spool 22. Although not shown in FIGS. 5 and 6, a clutch disengagement device 28 discussed below and shown in FIGS. 7-9, allows disengagement of the clutch disc 26a from the friction pads 26b.

Referring particularly to FIG. 6 as the fibers 50 are slowly drawn from the spool 22, the spring 24 begins to wind from position $A_0$ to position $A_1$ through an angle β. During angular rotation through β, the clutch disc 26a rotates along with the friction pads 26b. However when the rotation of the spool 22 advances to the position shown as A2, the rotational force applied to the clutch disc 26a by the spring 24 shown by the frictional drag 31 overcomes the friction 33 between the clutch disc 26a, and the friction pads 26b thus allowing the clutch disc 26a to slip in the direction 31 relative to the pads 26b.

Angular displacement of the spool 22 through the angle β allows the fibers to advance to position $P_1$. The advancement of the fibers 50 to point $P_2$ corresponds to the angular displacement at $A_2$ where the clutch disc 26a begins to slip. When the fibers 50 advance from $P_1$ to $P_2$, the force F applied to the fibers 50 will be equal to the rotational restraining moment between the clutch disc 26a and the compressive force applied by the spring 24 to the clutch disc 26a. In the event that the advancement of the fibers 50 is stopped and retracted from position $P_2$ to position $P_1$, the resulting slack in the fibers 50 is taken up by the torsion spring 24.

Figure 8:
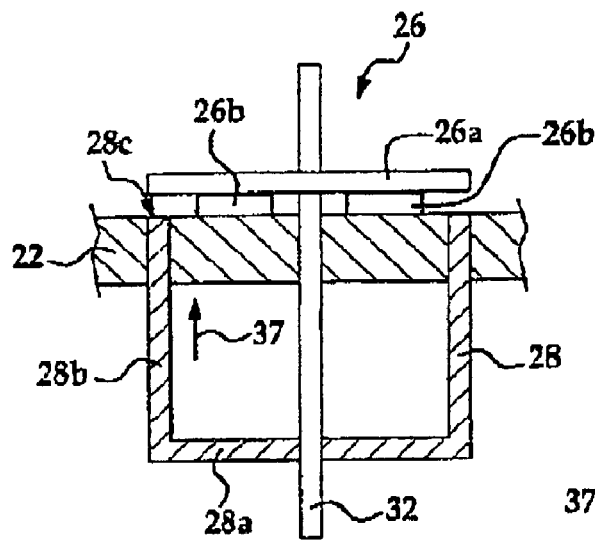
FIG. 8 is an illustration of a sectional view of the clutch disengagement device, showing the clutch in its engaged position.
Figure 9:
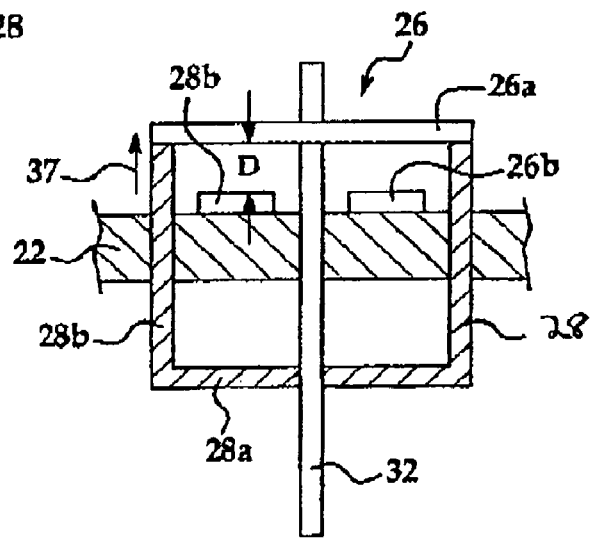
FIG. 9 is an illustration of a sectional view similar to FIG. 8 but showing the disengagement device having disengaged the clutch.

Referring now also to FIGS. 7-9, a cylindrically shaped clutch deactivation device 28 may be optionally provided in order to disengage the clutch 26 where it is desired, for example to reduce the drag force on the fibers 50 during start-up of the head 42, or when the placement of a new tape bandwidth 55 is about to be commenced. As best seen in FIG. 8, the clutch deactivation device 28 is generally cylindrical in shape and includes an end wall 28a disposed outside of the hub 22. The sides 28b of the device 28 slide through the hub 22 so that the end 28c of the device 28 may engage the periphery of the clutch disc 26a. Thus, by sliding the device 28 axially 37 into the hub 22, the force applied to the clutch disc 26a by the spring 24 is overcome, allowing the clutch disc 26a to be displaced along the shaft 32 a distance "D" (FIG. 9), which in turn disengages the clutch disc 26a from the friction pads 26b. Due to the spring loading provided by spring 24, releasing the device 28 results in the spring 24 forcing the clutch disc 26a back into frictional engagement with the friction pads 28b.

Figure 10:
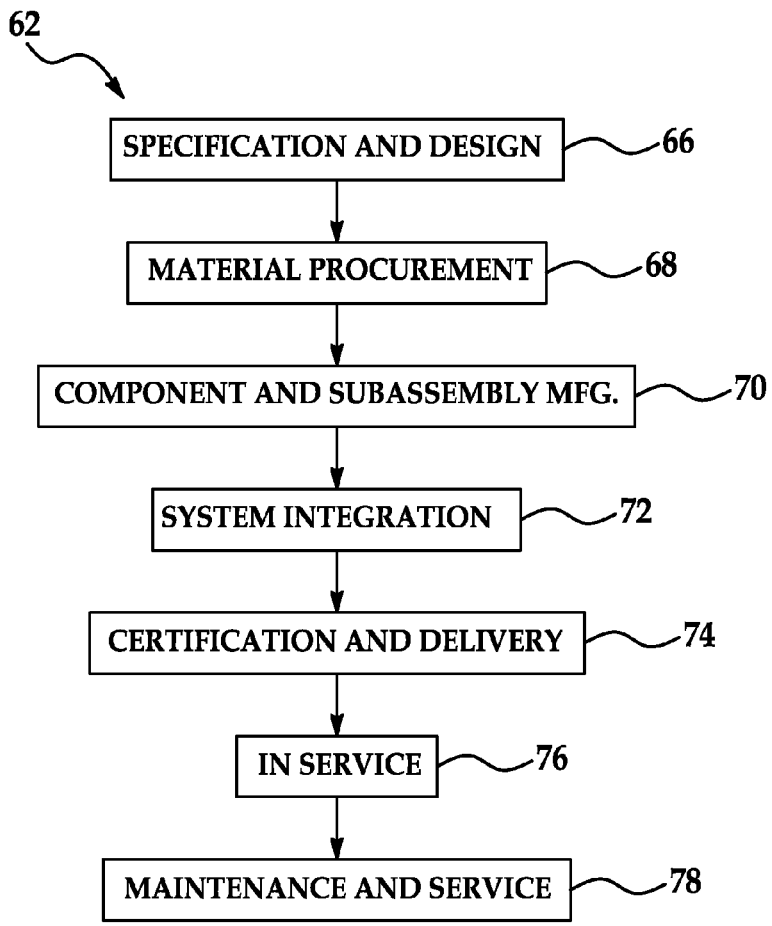
FIG. 10 is an illustration of a flow diagram of aircraft production and service methodology.
Figure 11:
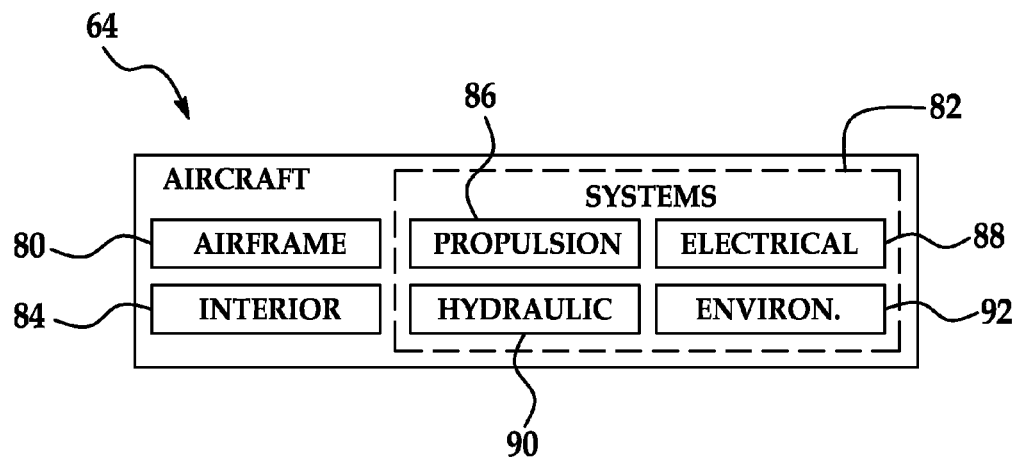
FIG. 11 is an illustration of a block diagram of an aircraft.

Embodiments of the disclosure may find use in a variety of potential applications, particularly in the transportation industry, including for example, aerospace, marine and automotive applications. Thus, referring now to FIGS. 10 and 11, embodiments of the disclosure may be used in the context of an aircraft manufacturing and service method 62 as shown in FIG. 10 and an aircraft 64 as shown in FIG. 11. During pre-production, exemplary method 62 may include specification and design 66 of the aircraft 64 and material procurement 68. During production, component and subassembly manufacturing 70 and system integration 72 of the aircraft 62 takes place. The simplified tensioning device 20 may be used in an AFP machine employed to fabricate composite structures forming components or subassemblies that are assembled at 70 or integrated as part of a system at 72. Thereafter, the aircraft 64 may go through certification and delivery 56 in order to be placed in service 76. While in service by a customer, the aircraft 64 is scheduled for routine maintenance and service 78 (which may also include modification, reconfiguration, refurbishment, and so on). The simplified tensioning device may be used in an AFP machine employed to fabricate replacement parts or components used in the maintenance and service 78.

Each of the processes of method 62 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 64 produced by exemplary method 62 may include an airframe 80 with a plurality of systems 82 and an interior 84. Examples of high-level systems 82 include one or more of a propulsion system 86, an electrical system 88, a hydraulic system 90, and an environmental system 92. Any number of other systems may be included. Although an aerospace example is shown, the principles of the disclosure may be applied to other industries, such as the marine and automotive industries.

Systems and methods embodied herein may be employed during any one or more of the stages of the production and service method 62. For example, components or subassemblies corresponding to production process 70 may be fabricated or manufactured in a manner similar to components or subassemblies produced while the aircraft 64 is in service. Also, one or more apparatus embodiments, method embodiments, or a combination thereof may be utilized during the production stages 70 and 72, for example, by substantially expediting assembly of or reducing the cost of an aircraft 64. Similarly, one or more of apparatus embodiments, method embodiments, or a combination thereof may be utilized while the aircraft 64 is in service, for example and without limitation, to maintenance and service 78.

Although the embodiments of this disclosure have been described with respect to certain exemplary embodiments, it is to be understood that the specific embodiments are for purposes of illustration and not limitation, as other variations will occur to those of skill in the art.

What is claimed:

1. A fiber tensioning device for use with a spool of fiber from which fibers are drawn, comprising:
   a support;
   a hub rotatably mounted on the support, the hub being adapted to have the spool of fibers mounted thereon for rotation therewith on the support, said hub rotatably mounted for rotation around a shaft, said shaft stationary with respect to rotation of said hub around said shaft; and
   means for applying drag force on fibers being drawn from the spool, said means for applying drag force being located on the hub and comprising biasing means wherein a portion of said biasing means is fixed to said shaft.

2. The device of claim 1, wherein the means for applying drag force includes:
   said biasing means for biasing the hub in a direction resulting in the drag force being applied to the fibers drawn from the spool; and
   means for limiting the drag force applied to the hub by the biasing means.

3. The device of claim 1 wherein:
   the biasing means includes a spring mounted between the hub and the shaft.

4. The device of claim 3, wherein the spring is sleeved over the shaft.

5. The device of claim 2, wherein the means for limiting the drag force includes a slip clutch.

6. The device of claim 5, wherein the clutch includes:
   a clutch disc, and
   a friction pad frictionally engaging the clutch disc.

7. The device of claim 6, wherein:
   the biasing means includes a spring,
   the clutch disc is connected to the spring, and
   the friction pad is mounted on the hub.

8. The device of claim 5, further comprising:
   means on the hub for disengaging the clutch.

9. For use with an automatic fiber placement system having at least one supply spool of fibers, a fiber tensioning device for maintaining tension on fibers drawn from the spool, comprising:
   a rotatable hub adapted to have the supply spool mounted thereon for rotation with the hub, said hub rotatably mounted for rotation around a shaft, said shaft stationary with respect to rotation of said hub around said shaft; and
   means for applying a rotational force on the hub opposing a force applied to the hub by fibers being drawn from the spool, said means for applying said rotational force being located on the hub and comprising biasing means wherein a portion of said biasing means is fixed to said shaft.

10. The device of claim 9, wherein the biasing means includes a spring.

11. The device of claim 9, further comprising:
    means for limiting the force applied to the hub by the means for applying the rotational force, wherein said means for limiting the force is located on the hub.

12. The device of claim 11, wherein the means for limiting the force applied to the hub includes a slip clutch.

13. The device of claim 12, wherein the clutch includes:
    a clutch disc, and
    a clutch pad frictionally engaging the clutch disc.

14. The device of claim 12, further comprising:
    means for disengaging the clutch.

15. A method of maintaining tension on fibers being drawn from a fiber supply spool on an automatic fiber placement machine, comprising:
    placing the spool on a hub; and
    using a spring within the hub to apply a rotational force to the hub that maintains tension on the fibers being drawn from the spool, said hub rotatably mounted for rotation around a shaft, said shaft stationary with respect to rotation of said hub around said shaft, a portion of said spring fixed to said shaft.

16. The method of claim 15, further comprising:
    using a slip clutch within the hub to limit the rotational force applied to the hub by the spring.

17. The method of claim 16, further comprising:
    selectively disengaging the clutch to reduce the tension on the fibers being drawn from the spool.

18. The method of claim 17, wherein selectively disengaging the clutch is performed by displacing a clutch disengagement device on the hub.

19. For use with an automatic fiber placement system having at least one supply spool of fibers, a fiber tensioning device for maintaining tension on fibers drawn from the spool, comprising:
    a shaft;
    a hub adapted to have the spool mounted thereon;

means including bearings for mounting the hub for rotation around the shaft, said shaft stationary with respect to rotation of said hub around said shaft;
a spring sleeved over the shaft inside the hub, the spring having a first end secured to the shaft and having a second end;
a slip clutch within the hub and coupled between the second end of the spring and the hub; and
means on the hub for disengaging the clutch.

20. A method of maintaining tension on fibers being drawn from a fiber supply spool in an automatic fiber placement system, comprising:
placing the spool on a hub, said hub rotatably mounted for rotation around a shaft, said shaft stationary with respect to rotation of said hub around said shaft, a spring sleeved over said shaft and comprising a first end fixed to said shaft;
connecting a second end of said spring with the hub through a slip clutch;
using the spring to apply a rotational force to the hub keeping the fibers in tension;
using the clutch to limit the rotational force applied to the hub by the spring;
placing a clutch disengagement device on the hub; and
using the clutch disengagement device to selectively disengage the spring from the hub.

* * * * *